(12) United States Patent
McHenry

(10) Patent No.: US 10,306,869 B2
(45) Date of Patent: Jun. 4, 2019

(54) ANIMAL TOENAIL DEVICE

(71) Applicant: Scott R McHenry, Kissimmee, FL (US)

(72) Inventor: Scott R McHenry, Kissimmee, FL (US)

(*) Notice: Subject to any disclaimer, the term of this patent is extended or adjusted under 35 U.S.C. 154(b) by 182 days.

(21) Appl. No.: 15/675,153

(22) Filed: Aug. 11, 2017

(65) Prior Publication Data
US 2019/0045746 A1 Feb. 14, 2019

(51) Int. Cl.
*A01K 13/00* (2006.01)
*A45D 29/22* (2006.01)
*A01L 7/06* (2006.01)

(52) U.S. Cl.
CPC ............ *A01K 13/007* (2013.01); *A45D 29/22* (2013.01); *A01L 7/06* (2013.01)

(58) Field of Classification Search
CPC .............................. A01K 13/00; A01K 13/007
USPC ........................................................ 119/851
See application file for complete search history.

(56) References Cited

U.S. PATENT DOCUMENTS

| 2,028,674 | A | * | 1/1936 | Larson | A01K 13/006 119/851 |
| 4,962,731 | A | * | 10/1990 | Wexler | A01K 13/00 119/851 |
| 6,659,047 | B2 | * | 12/2003 | Gat | A01K 13/006 119/851 |
| 7,069,879 | B1 | * | 7/2006 | Wexler | A01K 13/006 119/851 |
| 7,703,419 | B1 | * | 4/2010 | Wexler | A01K 13/00 119/851 |
| 2013/0256162 | A1 | | 10/2013 | Snyder et al. | |

FOREIGN PATENT DOCUMENTS

WO          2013148292 A1    10/2013

* cited by examiner

*Primary Examiner* — Richard T Price, Jr.
(74) *Attorney, Agent, or Firm* — Oliff PLC

(57) ABSTRACT

An animal toenail device having an inner space for receiving a toenail of an animal, the inner space formed by a first side wall, a second side wall, a front wall and a bottom wall. The device comprises a first side wall disposed along a first lateral side of the device, a second side wall disposed along a second lateral side of the device, a front wall disposed at a front end of the device and configured to connect the first side wall and the second side wall at the front end of the device, a bottom wall disposed on a bottom side of the device and configured to connect the first side wall and the second side wall at the bottom end of the device, the bottom wall comprising a flat contact surface.

22 Claims, 3 Drawing Sheets

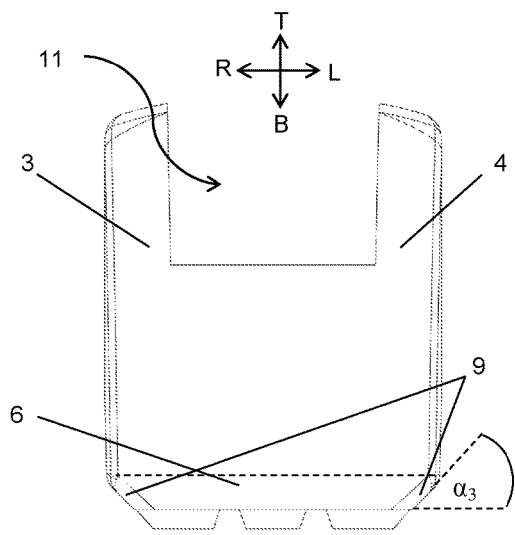
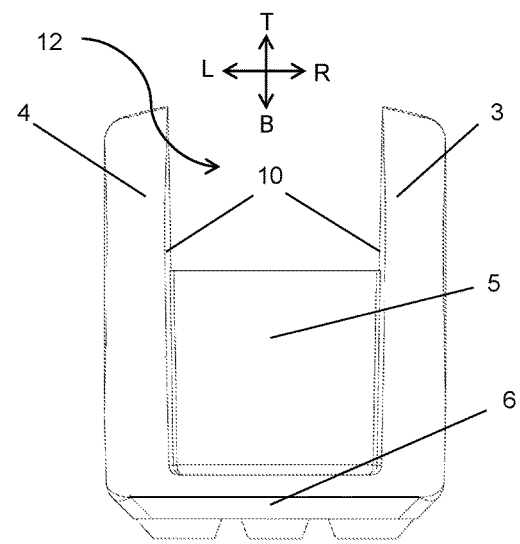
FIGURE 3A                     FIGURE 3B
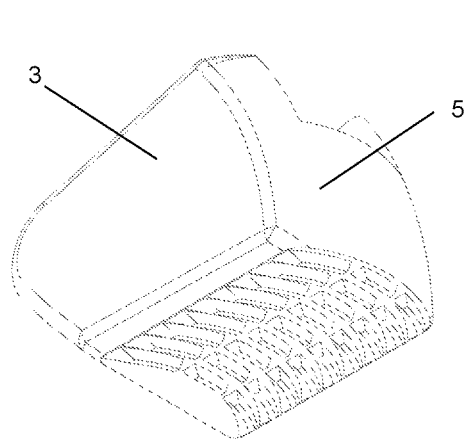
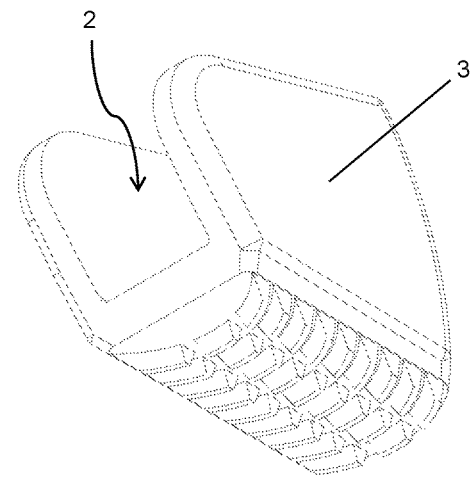
FIGURE 4A                     FIGURE 4B

ANIMAL TOENAIL DEVICE

TECHNICAL FIELD

This application relates to an animal toe grip device having an inner space for receiving a toenail of an animal and enhancing grip or traction of the toenail on various surfaces.

BACKGROUND

Physiologically, dogs and other animals are equipped with nails or claws on the ends of their toes or other digits in order to gain traction on various surfaces. This design is useful in many natural settings. However, on harder surfaces the toenails disadvantage the animals due to slippage. This problem is particularly prevalent on the hard surface flooring in homes where animals are often kept as pets. The slipping and lack of traction on these surfaces can result in loss of stability, potential falls and is generally very dangerous to the animal. The problem is compounded when the animal suffers from age or physiological conditions that demand stability and secure traction during forward and backward movement as well as getting up and lying down.

Conventional solutions attempt to address this problem with toenail or paw covers, including sheaths or tubular members that are removably securable about the tip and long mid-portion of an animal's toenail.

For example, US 2013/0256162 to Snyder et al. discloses a toenail grip that includes a tubular member removably securable via frictional interference to the nail of the animal for increasing traction. The tubular member is constructed of a flexible, returnably-resilient material having non-slip or gripping characteristics.

U.S. Pat. No. 4,962,731 to Wexler discloses an animal toe nail cover having an elongated sheath for animal toe nails. The elongated sheath has a cavity extending throughout the length of the sheath defining a telescopic relation over an animal toe nail encasing. The cavity has a first open end, an edge having means for engaging against a side wall of an animal toe nail, and a second closed tip end. The device is designed to slip off of surfaces in order to protect drapes, furniture, skin and the like from nail scratches.

U.S. Pat. No. 7,703,419 to Wexler discloses an animal toe nail covering that utilizes a double dip polymeric manufacturing process to produce a layered cap, each layer being capable of having a different durometer, thickness or color than that of the adjacent layer. The cap may also contain a series of internal cleats to help secure the cap to the animal's toenail. Various adhesive methods, some of which are included in the manufacturing process, are also disclosed for adhering the nail cap to the animal's toenail. The device is designed to slip off of surfaces in order to protect drapes, furniture, skin and the like from nail scratches.

While devices such as is disclosed in 2013/0256162 have been known to provide some enhanced gripping affect, they still prevent significant drawbacks in terms of insufficient contact surface area, gripping features and longevity due to inferior structural design. These tubular designs also easily slip off during use. Moreover, the toenail sheath structure of U.S. Pat. Nos. 4,962,731 and 7,703,419 is designed to slip on surfaces. These devices merely mimic the shape of the toenail without providing sufficient contact surface area and easily fail off during use. The conventional devices provide nearly no benefit under wet conditions as the surfaces of the devices themselves are prone to slippage under these conditions. The conventional devices also do not provide any solution to medical conditions resulting in inverted dragging of the nail.

Thus, there is and long has been a substantial need in the medical and pet industry for a device that ensures safe and effective traction for animals, and particularly animals with physiological disadvantages resulting from, for example, age and neurological conditions.

It is an object of the disclosed embodiments to resolve the above problems with conventional devices and provide much improved gripping and traction, durability and longevity.

SUMMARY

According to embodiments, there is provided an animal toenail device having an inner space for receiving a toenail of an animal, the inner space formed by a first side wall, a second side wall, a front wall and a bottom wall. The device comprises a first side wall disposed along a first lateral side of the device, a second side wall disposed along a second lateral side of the device, a front wall disposed at a front end of the device and configured to connect the first side wall and the second side wall at the front end of the device, a bottom wall disposed on a bottom side of the device and configured to connect the first side wall and the second side wall at the bottom end of the device, the bottom wall comprising a flat contact surface.

The flat contact surface may include at least one gripping feature. The gripping feature may be a tread pattern.

The bottom wall may further comprise two angled portions each formed on an outer side of the bottom wall corresponding to the lateral sides of the device where the first side wall and the second side wall connect to the bottom wall. The two angled portions may be firmed at an angle in a range of 20 to 80° relative to the flat contact surface.

The front wall may form an arc-shape configured to receive an arc-shape of the toenail. The toenail may be a toenail of a dog and the arc-shape of the front wall may be about 14.5° relative to vertical plumb.

The first side wall and the second side wall may be substantially parallel to each other in lateral and vertical directions.

Rear-top portions of the first side wall and the second side wall may form an arc-shape.

The front wall may extend up the first side wall and the second side wall in a vertical direction only partially.

The animal toenail device may further comprise a first open space at the front end of the device. The first open space may be formed by front-top portions of the first side wall and the second side wall and an upper portion of the front wall. The first open space may be configured to allow the first side wall and the second side wall to be pinched in an inward direction into the inner space.

The animal toenail device may further comprise a second open space at the rear end of the device. The second open space may be formed by rear portions of the first side wall and the second side wall and a rear portion of the bottom wall. The second open space may be configured to allow air to circulate through the inner space. The second open space may also be configured to allow drainage of fluid from the inner space.

The animal toenail device may further comprise an adhesive layer formed on an inner surface of at least one of the first side wall, the second side wall, the front wall and the bottom wall. The adhesive layer may include cyanoacrylate.

At least one of the first side wall, the second side wall, the front wall and the bottom wall may be formed from an elastomeric material. The elastomeric material may be a thermoplastic vulcanizate.

Rear portions of the first side wall and the second side wall may extend beyond a rear portion of the bottom wall in a rearward direction.

A length of the flat contact surface may be in a range of 7 to 15 mm and a width of the flat contact surface may be in a range of 4 to 10 mm.

A front-bottom portion of the bottom wall may form an arc-shape.

BRIEF DESCRIPTION OF THE DRAWINGS

FIGS. 3A and 3B illustrate front and rear views, respectively, of the animal toe device in FIG. 1;

FIGS. 4A and 4B illustrate front-bottom-side and rear-bottom-side views, respectively, of the animal toe device in FIG. 1.

DETAILED DESCRIPTION

Figure 1:
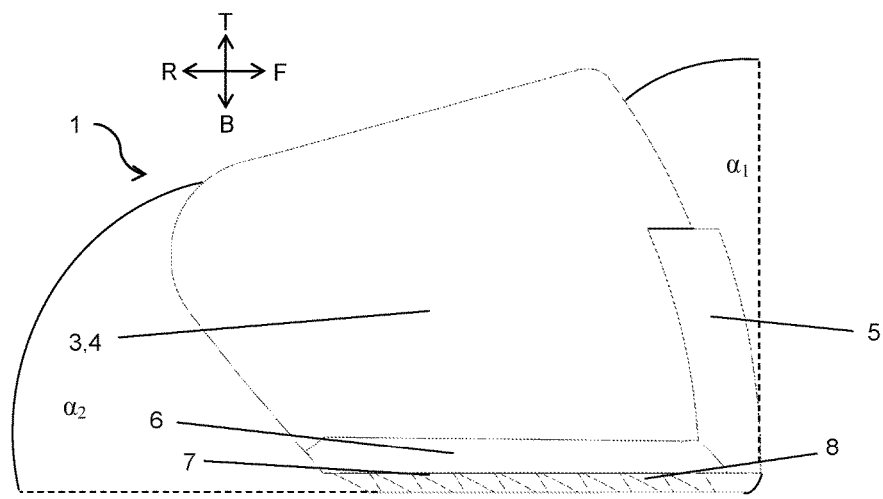
FIG. 1 illustrates an animal toe device according to an embodiment.

As shown in FIG. 1, an animal toenail device 1 according to disclosed embodiments has an inner space 2 (best shown in FIG. 4B) for receiving a toenail of an animal. The inner space 2 may be formed by two side walls 3, 4, a front wall 5 and a bottom wall 6. The two side walls 3, 4 are disposed along respective lateral sides of the animal toenail device 1 in a direction from the front F to the rear R. The front wall 5 is disposed at the front end F of the device. The front wall 5 may be configured to connect to the side walls 3, 4 at the front end F of the device. Alternatively, the side walls 3, 4 may be configured to connect to the front wall 5. A bottom wall 6 is disposed on a bottom side B of the device and configured to connect to the side walls 3, 4 at the bottom end of the device. Alternatively, the side walls 3, 4 may be configured to connect to the bottom wall 6. Rear portions of the side walls 3, 4 may extend beyond a rear portion of the bottom wall in a rearward direction R, as seen in FIG. 1.

As shown in FIG. 1, the front wall 5 forms an arc-shape configured to receive a corresponding arc-shape of the toenail. The arc-shape of the front wall 5 may be formed at any suitable angle $\alpha_1$ corresponding to the type of animal, and particularly the shape and configuration of the toenail of the specific animal. For example, in the case of a dog, the toenail is curved in a range of 12 to 17°, 13 to 16°, and more preferably 14 to 15° or about 14.5° relative to vertical plumb to correspond to the shape of the toenail of the dog. This feature provides for superior contact along the height of the toenail with the front wall 5 of the device 1 over conventional devices.

A front-bottom portion of the bottom wall may form an arc-shape, as seen in FIG. 1. Some animals suffer from occasional dragging of the tops of their toenails as they walk. For example, Degenerative Myelopathy is a disease with such symptoms. There are other conditions being neurological, ocular and muscular-based that present the same nail dragging. The arc-shape of the front-bottom portion of the bottom wall is advantageous in that it provides a curved surface that slips or slides when the nail is inverted and would otherwise catch on the walking surface causing discomfort, pain or stumbling.

In embodiments, the rear portion of the side walls 3, 4 forms an angle $\alpha_2$ with the horizontal plane of the flat contact surface. This angle may be formed at any suitable angle corresponding to the type of animal, and particularly the shape and configuration of the toenail of the specific animal. For example, in the case of a dog, $\alpha_2$ is in a range of 40 to 60°, 45 to 55°, and more preferably 50 to 53° or about 52° relative to the horizontal plane of the flat contact surface to correspond to the shape of the toenail of the dog. This feature provides for superior fit and functioning of the paw when the device is secured to the nail over conventional devices.

Figure 2A:
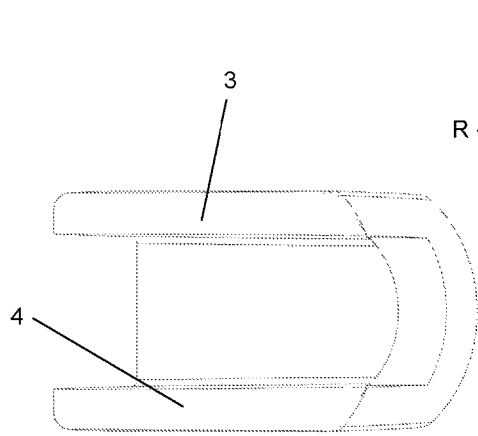
FIGS. 2A and 2B illustrate top and bottom views, respectively, of the animal toe device in FIG. 1.

The side walls 3, 4 may be substantially parallel to each other in lateral and vertical directions, as best shown in FIGS. 2A, 3A and 3B. The side walls 3, 4 may also be offset to each other in lateral and/or vertical directions depending on the shape of the toenail. Rear-top portions of the two side walls 3, 4 may form an arc-shape, as seen in FIGS. 1, 4A, 4B, 5A and 5B. This feature reduces friction on neighboring toes and eliminates potential sharp areas of contact with neighboring toes, which is important in establishing comfort and enhancing the long term benefit of the device to the animal.

The side walls 3, 4 provide ease of application of adhesive agent and optimal force while fixing adhesive to the toe nail and inner surfaces of the side walls 3, 4. The side walls 3, 4 may be flexible in order to provide for ease of fixing the adhesive both to the animal toenail device 1 and to the toenail surface. Any suitable adhesive agent may be used. For example, in embodiments, the adhesive agent may be cyanoacrylate.

In practice, the adhesive agent may be applied to each side of the toenail and any inner surface of the animal toenail device 1. Then, the animal toenail device is slipped on to the nail by pressing the side walls 3, 4 together using a pinching force with two fingers, thereby resulting in a safe and easy fixing of the device to the toenail. This feature allows for excellent application of pressure while applying the adhesive to allow for the animal toenail device 1 to stay affixed for a period of several weeks up to several months.

The adhesive agent may be applied by any suitable means known in the art. For example, the adhesive agent may be applied as an adhesive layer 10 formed on an inner surface of at least one of the side walls 3, 4, the front wall 5 and the bottom wall 6. The adhesive layer 10 may also be applied directly to the toenail. The adhesive layer 10 may be applied, for example, by brush coating, spray means or blotching application.

According to embodiments, the front wall 5 extends up the side walls 3, 4 only partially in a vertical direction, as show in FIG. 1. The extent to which the front wall 5 extends up the side walls 3, 4 depend, in part, on the shape of the toenail. It may also depend on the visibility required for proper application of the device. In embodiments, the front wall 5 extends up the side walls 3, 4 to about a midpoint of the side walls 3, 4 in a vertical direction. This feature provides viewing for proper fit and optimal application of adhesive, while positioning of the animal toenail device 1. This feature also allows for increased independent flexibility to each sidewall of the side walls 3, 4, thus increasing the ease of application using the "pinching action" referenced herein.

The animal toenail device 1 may further comprise an open space 11 at the front end F of the device. The open space may be formed by front-top portions of the side walls 3, 4 and an upper portion of the front wall 5, as shown in FIG. 3A. The open space 11 is configured to allow the side walls 3, 4 to be pinched in an inward direction into the inner space 2, as referenced herein.

The animal toenail device 1 may further comprise an open space 12 at the rear end R of the device, as shown in FIG. 3B. The open space 12 may be formed by rear portions of the side walls 3, 4 and a rear portion of the bottom wall 6. The open space 12 may be configured to allow air to circulate through the inner space 2 and to allow drainage of fluid from the inner space such as during washing, swimming and inclement weather conditions. This feature provides air circulation, drainage, and ease of application and unexpected benefits in terms of the health of the nail. This feature also enables the animal toenail device 1 to easily be slipped onto the toenail.

The dimensions of the two side walls 3, 4, the front wall 5 and the bottom wall 6, are not particularly limited and depend on the particular animal and dimensions of the animal's toenail, as will be recognized by one of ordinary skill in the art.

Figure 2B:
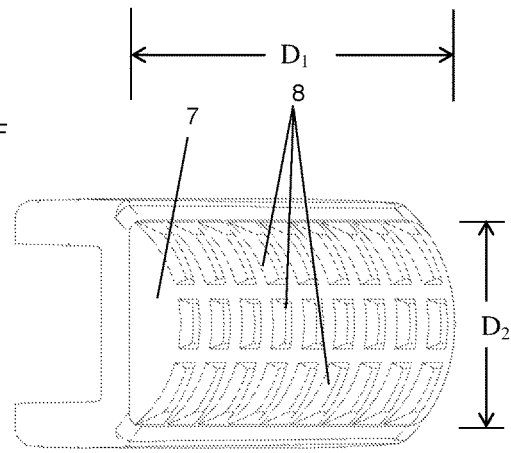
Figure 5A:
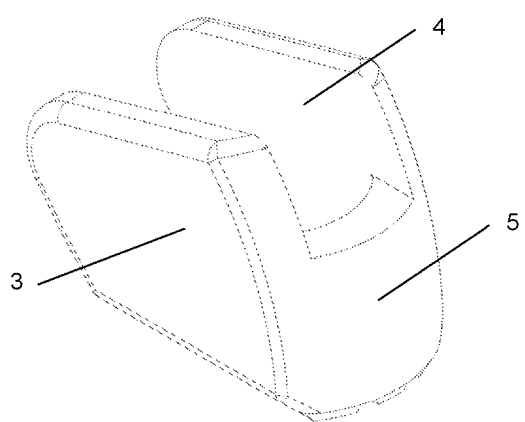
FIGS. 5A and 5B illustrate front-top-side and rear-top-side views, respectively, of the animal toe device in FIG. 1.
Figure 5B:
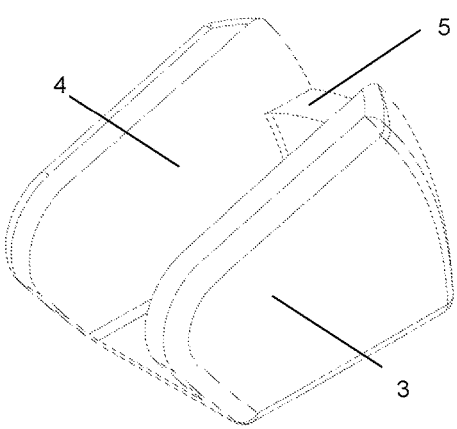

According to embodiments, the bottom wall 6 includes a flat contact surface 7 that is substantially flat along longitudinal and lateral directions, as best shown in FIG. 2B. The flat contact surface 7 is configured to be larger than contact surfaces of conventionally known toe grip devices. The flat contact surface 7 may include one or more gripping features 8 configured for optimizing grip or traction. For example, the gripping feature may be a tread pattern. Multiple treads built into the flat contact surface 7 greatly increase traction with hard surfaces such as wood and tile flooring, cement, marble and wet surfaces. In this regard, the flat contact surface 7 is similar to a tennis shoe in shape and material composition and design, including built in treads for optimal traction. The gripping feature may also include adhesive or other surface treatments that increase friction or traction action, as would be recognized by one of ordinary skill in the art.

The dimensions of the flat contact surface are not particularly limited and depend on the particular animal and dimensions of the animal's toenail, as will be recognized by one of ordinary skill in the art. In the case of a dog toenail, the length $D_1$ of the flat contact surface is in the range of 7 to 15 mm, 10 to 14 mm, and preferably 11 to 13 mm or about 12 mm. The width $D_2$ of the flat contact surface is in the range of 4 to 10 mm, 5 to 9 mm, and preferably 6 to 8 mm or about 7 mm.

According to embodiments, the bottom wall 6 may further include angled portions 9 each formed on an outer side of the bottom wall corresponding to the lateral sides of the device where the first side wall and the second side wall connect to the bottom wall, as shown in FIGS. 3A and 3B. The two angled portions may be formed at any suitable angle corresponding to the type of animal, and particularly the shape and configuration of the toenail of the specific animal. For example, in the case of a dog, the angle $\alpha_3$ may in a range of 20 to 80°, 30 to 70°, and more preferably, 40 to 60°, relative to the flat contact surface 7.

As shown in FIGS. 3A, 3B, 4A and 4B, the angle $\alpha_2$ increases surface area of contact while transitioning from lying down to standing. This feature also increases the amount of toe grip surface material in contact with flooring when the animal is in the lying down position and is transitioning to a standing position. Given that the toenail presents itself at a different angle while lying down compared with standing, the angle cut is optimally to improve traction during this transitioning. This is an especially difficult time for dogs on hard surfaces. Without good traction dogs spend a lot of energy and increase wear and tear on joints, etc., while trying to stand, often slipping, and sliding and flailing excessively.

The animal toenail device 1 may be constructed with any suitable material known in the art. For example, the material may be include, but is not limited to, the thermoplastic elastomer (TPE) family of polymers or thermoset rubbers (EPDM). These materials combine the characteristics of vulcanized rubber with the processing properties of thermoplastics. EPDM rubber (ethylene propylene diene monomer (M-class) rubber) is an elastomer characterized by a wide range of applications. In embodiments, the animal toenail device 1 is constructed with Thermoplastic Vulcanizates (TPV). TPV is a dynamically vulcanized alloy consisting mostly of fully cured EPDM rubber particles encapsulated in a polypropylene (PP) matrix.

The animal toenail device 1 may be manufactured according to any suitable means known in the art. For example, the animal toenail device 1 may be manufactured using an injection molding process. Other suitable means will be readily apparent to one of ordinary skill in the art.

It will be appreciated that the above-disclosed features and functions, or alternatives thereof, may be desirably combined into different compositions, systems or methods. Also, various alternatives, modifications, variations or improvements may be subsequently made by those skilled in the art. As such, various changes may be made without departing from the spirit and scope of this disclosure.

What is claimed is:

1. An animal toenail device having an inner space adapted to receive a toenail of an animal, the inner space formed by a first side wall, a second side wall, a front wall and a bottom wall, the device comprising:
    a first side wall disposed along a first lateral side of the device;
    a second side wall disposed along a second lateral side of the device;
    a front wall disposed at a front end of the device and configured to connect the first side wall and the second side wall at the front end of the device;
    a bottom wall disposed on a bottom side of the device and configured to connect the first side wall and the second side wall at the bottom end of the device, the bottom wall having a flat contact surface.

2. The animal toenail device according to claim 1, wherein the flat contact surface includes at least one gripping feature.

3. The animal toenail device according to claim 2, wherein the gripping feature is a tread pattern.

4. The animal toenail device according to claim 1, wherein the bottom wall further comprises two angled portions each formed on an outer side of the bottom wall corresponding to the lateral sides of the device where the first side wall and the second side wall connect to the bottom wall.

5. The animal toenail device according to claim 4, wherein the two angled portions are formed at an angle in a range of 20 to 80° relative to the flat contact surface.

6. The animal toenail device according to claim 1, wherein the front wall forms an arc-shape configured to receive an arc-shape of the toenail.

7. The animal toenail device according to claim 1, wherein the toenail is a toenail of a dog and the arc-shape of the front wall is about 14.5° relative to vertical plumb.

8. The animal toenail device according to claim 1, wherein the first side wall and the second side wall are substantially parallel to each other in lateral and vertical directions.

9. The animal toenail device according to claim 1, wherein rear-top portions of the first side wall and the second side wall form an arc-shape.

10. The animal toenail device according to claim 1, wherein the front wall extends up the first side wall and the second side wall in a vertical direction only partially.

11. The animal toenail device according to claim 1, further comprising a first open space at the front end of the device, the first open space being formed by front-top portions of the first side wall and the second side wall and an upper portion of the front wall.

12. The animal toenail device according to claim 11, wherein the first open space is configured to allow the first side wall and the second side wall to be pinched in an inward direction into the inner space.

13. The animal toenail device according to claim 1, further comprising a second open space at the rear end of the device, the second open space formed by rear portions of the first side wall and the second side wall and a rear portion of the bottom wall.

14. The animal toenail device according to claim 13, wherein the second open space is configured to allow air to circulate through the inner space.

15. The animal toenail device according to claim 13, wherein the second open space is configured to allow drainage of fluid from the inner space.

16. The animal toenail device according to claim 1, further comprising an adhesive layer formed on an inner surface of at least one of the first side wall, the second side wall, the front wall and the bottom wall.

17. The animal toenail device according to claim 16, wherein the adhesive layer includes cyanoacrylate.

18. The animal toenail device according to claim 1, wherein at least one of the first side wall, the second side wall, the front wall and the bottom wall are formed from an elastomeric material.

19. The animal toenail device according to claim 18, wherein the elastomeric material is a thermoplastic vulcanizate.

20. The animal toenail device according to claim 1, wherein rear portions of the first side wall and the second side wall extend beyond a rear portion of the bottom wall in a rearward direction.

21. The animal toenail device according to claim 1, wherein a length of the flat contact surface is in a range of 7 to 15 mm and a width of the flat contact surface is in a range of 4 to 10 mm.

22. The animal toenail device according to claim 1, wherein a front-bottom portion of the bottom wall forms an arc-shape.

* * * * *